United States Patent [19]

Sommese et al.

[11] Patent Number: 5,622,533
[45] Date of Patent: Apr. 22, 1997

[54] VINYLAMINE COPOLYMER COAGULANTS FOR USE IN COAL REFUSE DEWATERING

[75] Inventors: Anthony G. Sommese, Aurora; Krishnan J. Pillai, Naperville, both of Ill.

[73] Assignee: Nalco Chemical Company, Naperville, Ill.

[21] Appl. No.: 572,271

[22] Filed: Dec. 13, 1995

[51] Int. Cl.$^6$ ............................................. C10L 5/00
[52] U.S. Cl. ................................................. 44/620; 44/626
[58] Field of Search ........................................ 44/620, 626

[56] References Cited

U.S. PATENT DOCUMENTS

| | | | |
|---|---|---|---|
| 4,217,214 | 8/1980 | Dubin | 210/52 |
| 4,421,602 | 12/1983 | Brunnmueller et al. | |
| 4,705,640 | 11/1987 | Whittaker | 210/733 |
| 4,880,497 | 11/1989 | Pfohl et al. | |
| 4,921,621 | 5/1990 | Costello et al. | |
| 4,952,656 | 8/1990 | Ta-Wang et al. | |
| 5,037,927 | 8/1991 | Itagaki et al. | |
| 5,126,395 | 6/1992 | End et al. | |
| 5,185,083 | 2/1993 | Smigo et al. | 210/735 |
| 5,330,546 | 7/1994 | Ramesh et al. | 44/620 |
| 5,476,522 | 12/1995 | Kerr et al. | 44/620 |
| 5,529,588 | 6/1996 | Sommese et al. | 44/626 |

*Primary Examiner*—Jacqueline V. Howard
*Attorney, Agent, or Firm*—James J. Drake; Robert A. Miller; Patricia A. Charlier

[57] ABSTRACT

The invention provides a method for dewatering coal tailing aqueous slurries in a twin belt press process. The method including the step of adding to the slurry a coagulant composition including a vinylamine copolymer including from about 1 to about 99 mole percent vinylamine and from about 1 to about 99 mole percent of at least one monomer selected from the group consisting of vinylformamide, vinyl alcohol, vinyl acetate, vinyl pyrrolidinone and the esters, amides and salts of acrylic acid and methacrylic acid.

8 Claims, No Drawings

5,622,533

VINYLAMINE COPOLYMER COAGULANTS FOR USE IN COAL REFUSE DEWATERING

FIELD OF THE INVENTION

The invention provides a method for dewatering coal slurries. This invention relates to the treatment of coal tailings, and more specifically provides a chemical method for coagulation and thickening of clay and coal particles, followed by belt press dewatering of the aqueous coal tailing slurry. The chemical method is a 2-component system consisting of an anionic flocculant followed by a coaglant that contains the vinylamine functionality.

BRIEF DESCRIPTION OF THE PRIOR ART

In the mining of coal, various types of shale and clay are produced along with the coal. To increase the heating value of the coal and to reduce hauling costs, a coal washing process is normally used. In this process, the coal is graded and the coarse sizes, generally greater than a ¼ of an inch in diameter, are then fed through a slurry vat in which the density of the vat media is closely controlled. The coal floats in the heavy media of the vat while heavier rocks sink to the bottom.

The smaller-sized fractions, between a ¼ inch and 1/16 in diameter, may be processed in spiral concentrators, shaking tables, hydrocyclones. The smallest particles, less than 0.5 millimeter in diameter, are processed by froth flotation. In each of these steps, more coal is recovered and the refuse is dewatered as well as possible. While spiral concentrations, shaking tables, and hydrocyclones utilize differences in specific gravity, separation based on differences in specific gravity is inefficient for smaller-sized fractions. Thus, in these lower size ranges, differences in the surfaces characteristics between high ash particles and the cleaner low ash particles are relied on in order to separate the particles. This process is called froth flotation.

In the froth flotation process, the fine coal particles are fed to an agitation tank in the form of a slurry having solids levels typically at about 3 to 8 percent but sometimes as high as about 15 to 20 percent. The slurry is conditioned with a class of chemicals called collectors which selectively coat and thereby impart hydrophobicity to the coal particles while leaving the higher ash fractions untouched. A frother is then added and the slurry is conditioned. Air is then bubbled through the mixture. The hydrophobized coal particles stick to the bubbles and rise to the top of the tank in the form of a froth. High ash hydrophilic fractions remain in the slurry and are called tailings. The tailings, which typically constitute about 2 to 4 percent solids are then sent to a thickener to be settled, so that the water in the slurry may be reused in the process to thereby minimize or eliminate effluent flow. It is thus highly desirable to dewater this refuse slurry as efficiently as possible.

In the thickener, coagulants and flocculants are used to help dewater the slurry. Coagulants are added in order to neutralize charges on the particles in the slurry. The charge neutralized particles form pin or micro flocs. One commonly used and generally effective coagulant is polydiallyldimethylammonium chloride ("DADMAC") having a molecular weight of about 100,000 da. Treatment with such coagulants is then followed with treatment with a flocculant.

Flocculants work by gathering together the floc particles in a net, bridging from one surface to the other and binding the individual particles into large agglomerants. Flocculation not only increases the size of the flocced particles, it also affects the physical nature of the floc, so that the slurry will dewater at a faster rate because of the reduction of the gelatinous structure of the floc.

In the flocculation of tailing slurries, typical flocculants include anionic high molecule weight polymers, copolymers of acrylamide and acrylic acid (acrylates), polyacrylamides and polyacrylates having molecular weights from about 1,000,000 to about 20,000,000 da.

The flocs settle to the bottom of the thickener, and, after a short period of time form a compact bed. This bed is discharged as tailings from the bottom of the thickener in the form of a 30 to 40 percent solids slurry. The tailings are either sent to belt presses where they are further dewatered and then disposed of in tailing ponds or sent to tailings ponds.

A twin belt press uses a combination of gravity and gradually applied pressure to mechanically dewater the slurry. Coagulants and flocculants are added to the slurry to facilitate the dewatering process. The coagulant and flocculant improve dewatering by improving the drainage of water from the slurry. Although the order of addition can be varied, generally, for twin belt press dewatering operations, the flocculant is often added to the slurry before the coagulant is added.

SUMMARY OF THE INVENTION

The invention provides a method for thickening and dewatering coal tailing aqueous slurries in a twin belt press process, the method including the step of adding to the slurry a coagulant composition including a vinylamine copolymer including from about 1 to about 99 mole percent vinylamine and from about 1 to about 99 mole percent of at least one monomer selected from the group consisting of vinylformamide, vinyl acetate, vinyl alcohol, vinyl pyrrolidone and the esters, amides and salts of acrylic acid and methacrylic acid.

DESCRIPTION OF THE PREFERRED EMBODIMENTS

The invention provides a coagulant composition and a method of using the same. The invention provides improved coagulation and improved drainage of water from coal tailings during a twin belt press process. One aspect of the invention provides a vinylamine copolymer coagulant to accomplish this goal. According to the invention, the polymer is a copolymer or terpolymer which contains from about 1 to about 99 mole percent vinylamine monomer and/or a monomer hydrolyzable to vinylamine, and/or from 1–99 mole percent of the monomer vinylformamide, vinyl pyrrolidone, vinyl alcohol, vinyl acetate or the esters, amides and salts of acrylic acid and methacrylic acid. In thickener applications, the polymers of the invention may be added before or after the slurry is flocculated with a standard flocculant in the industry. Preferably, in twin belt press applications, the coagulants of the invention are added after the slurry is flocculated. According to another aspect of the invention, the invention provides a coagulant composition which includes the homopolymer polyvinylformamide.

For purposes of this invention, vinylamine monomers includes vinylamine and those monomers which are hydrolyzable to the following formula:

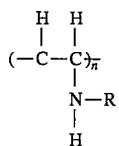

wherein: R is, preferably, one substituent group selected from the group consisting of hydrogen and an alkyl group having from 1–10 carbon atoms. More preferably, R is hydrogen or is an alkyl group having 1–4 carbons.

The vinylformamide monomer of the invention is non-hydrolyzed and has the following structure:

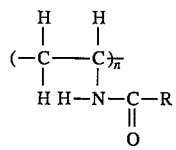

wherein: R is, preferably, one substituent group selected from the group consisting of hydrogen and an alkyl group having from 1–10 carbon atoms. More preferably, R is hydrogen or is an alkyl group having 1–4 carbons.

For purposes of the invention, acrylic acid monomer includes acrylic acid and those monomers hydrolyzable to the following formula:

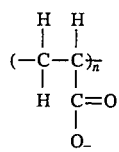

These monomers further include the esters amides and salts of acrylic acid and methacrylic acid. One preferred method of producing the vinylamine/vinyl alcohol containing polymers of the invention is to polymerize vinylformamide and vinyl acetate. Thereafter, the copolymer is hydrolyzed to a vinylamine/vinyl alcohol copolymer.

According to one embodiment of the invention, the coagulants of the invention includes a vinylamine/vinyl alcohol copolymer. Preferably, the copolymer will include from about 1 to about 99 mole % vinylamine and about 1 to about 99% vinyl alcohol. More preferably, the copolymer will include from about 2 to about 95 mole % vinyl alcohol and from about 98 to about 5 mole % vinylamine. Most preferably, the vinyl alcohol is included in the copolymer in an amount of from about 10 to about 20 mole % and the vinylamine is included in an amount of from about 90 to about 80 mole %.

According to a further embodiment of the invention, the coagulant composition includes vinylamine/vinylformamide copolymer. Preferably, the copolymer includes from about 1 to about 99% vinylamine and from about 1 to about 99% vinylformamide. More preferably, the copolymer includes from about 10 to about 90% vinylamine and from about 90 to about 10% vinylformamide. Most preferably, the copolymer includes from about 60 to about 90% vinylamine and from about 40 to about 10% vinylformamide.

The coagulant compositions of the present invention are applied to the coal tailings slurry as a dilute aqueous solution. Preferably, the aqueous solution is applied to the coal tailings slurry in a dosage of from about 0.100 to about 200.0 parts per million (ppm) of the polymers of the invention based on the total volume of the slurry. More preferably, the polymers of the invention are added to the slurry in a dosage of from about 1.0 to about 100 parts per million. Most preferably, the polymers of the invention are added to the slurry in a dosage of from about 2.0 to about 50.0 parts per million.

Processes for making the polymers of the invention are well known in the art. U.S. Pat. Nos. 5,126,395, 5,037,927, 4,952,656, 4,921,621, 4,880,497 and 4,421,602 all describe methods for preparing the polymers of the invention. Solution polymerization produces desirable high molecular weights. Polyvinylformamide and vinyl acetate/vinylformamide polymers are susceptible to alkaline or acid hydrolysis which converts some or all of the amide groups to amine groups. This hydrolysis phenomena is described in U.S. Pat. No. 4,421,602, the disclosure of which is incorporated herein by reference. Thus, by controlling the stoichiometry of the hydrolyzing agent (acid or base), it is possible to produce vinylformamide/vinylamine copolymers or vinylamine/vinylformamide/vinyl alcohol terpolymers.

The following examples are presented to describe preferred embodiments and utilities of the invention and are not meant to limit the invention unless otherwise stated in the claims appended hereto.

EXAMPLE 1

The coagulants of the invention were evaluated using a gravity dewatering test. The gravity dewatering test is a standard test in the industry and is a valuable tool for reliably screening and evaluating coagulants for twin belt press dewatering. Results obtained in testing can be directly translated to the plant process. The following procedure outlines the steps used in performing the test.

Five to ten gallons of untreated coal tailing slurry feed was obtained. Using a mixer, the slurry was mixed to uniformly disperse any coarse solids. Two hundred ml of slurry was transferred into a 500 ml graduated cylinder.

The coagulant was prepared as a 1% aqueous solution. The cylinder was inverted four times to thoroughly disperse the solids, then immediately 68 ppm of flocculant was added to the slurry. The cylinder was then inverted four additional times. The flocculant used was NALCO® 9810, a standard flocculant in the industry. NALCO® 9810 is an acrylamide/acrylate copolymer. The copolymer has a reduced specific viscosity ranging from 20 to 30. The coagulant solution is then immediately added to the slurry and inverted two additional times. The coagulants used are identified in Table 1 below. The control was coagulant "A". Coagulant A was NALCO® 9853, a standard coagulant used in this application in the industry.

TABLE 1

| Coagulant (CAT) | Composition | Molecular Weight |
| --- | --- | --- |
| A | NALCO ®9853 | — |
| B | VA/vinyl alcohol | 100,000 |
| C | PVF | 2 million |

VA - Vinylamine
PVF - Polyvinylformamide

The conditioned slurry was poured over a fine mesh, and immediately the amount of water draining was collected and measured as a function of time. The drainage was collected and recorded every ten seconds for a time period greater than actual plant process time for gravity drainage. The results are summarized in Table 2.

TABLE 2

| # | Reagent Floc | Reagent Cat | Dose (ppm) Floc | Dose (ppm) Cat | Inversions Floc | Inversions Cat | Free Drainage Volume (ml) 10 Sec | 20 Sec | 30 Sec | 40 Sec | 60 Sec |
|---|---|---|---|---|---|---|---|---|---|---|---|
| 1 | 9810 | A | 68 | 7.50 | 4 | 2 | 42 | 64 | 70 | 74 | 80 |
| 2 | 9810 | A | 68 | 3.75 | 4 | 2 | 32 | 48 | 58 | 66 | 71 |
| 3 | 9810 | A | 68 | 1.88 | 4 | 2 | 28 | 46 | 52 | 60 | 68 |
| 4 | 9810 | B | 68 | 7.50 | 4 | 2 | 50 | 68 | 77 | 80 | 86 |
| 5 | 9810 | B | 68 | 3.75 | 4 | 2 | 44 | 59 | 70 | 77 | 84 |
| 6 | 9810 | C | 68 | 7.50 | 4 | 2 | 30 | 46 | 56 | 62 | 70 |
| 7 | 9810 | C | 68 | 3.75 | 4 | 2 | 25 | 36 | 42 | 52 | 66 |

As shown in Table 2, the polymers of the invention consistently outperformed the standard coagulant in the industry. In several instances, the invention provided results which were much better than the standard in the industry. This represents a significant advance in the art.

EXAMPLE 2

Testing was done focusing on copolymers of vinylamine/vinylalcohol with low amine content and have the following percentages of vinylamine and vinylalcohol, respectively: 6/94, 12/88 and 18/82. The molecular weight ranges of these compounds were from 80–200K. The polymers were obtained from Air Products & Chemicals, as dry granular solids.

The coagulant was prepared as a 1% aqueous solution. The cylinder was inverted four times to thoroughly disperse the solids, then immediately 70 ppm of flocculant was added to the slurry. The cylinder was then inverted four additional times. The flocculant used was NALCO® 9806, a standard flocculant in the industry. The coagulant solution was then immediately added to the slurry and inverted two additional times. The coagulants used are identified in Table 3 below. The control coagulant was NALCO® 9853, a standard coagulant used in this application in the industry.

The conditioned slurry was poured over a fine mesh, and immediately the amount of water draining was collected and measured as a function of time. The drainage was collected and recorded for a time period greater than actual plant process time for gravity drainage. It is desirable to drain as much water as possible in the least amount of time.

TABLE 3

| Flocculant Dosage (ppm) | Coagulant Dosage (ppm) Time | Drainage Volume 10 | 15 | 20 | 30 sec |
|---|---|---|---|---|---|
| Nalco 9806 | Nalco 9853 | | | | |
| 70 ppm | 6.0 | 68 | 80 | 92 | 102 |
| 70 ppm | 12.5 | 92 | 108 | 119 | 132 |
| 70 ppm | 25.0 | 92 | 108 | 112 | 120 |
| 70 ppm | 50.0 | 66 | 78 | 86 | 100 |
| | 6/94 Vamine/Valcohol | | | | |
| 70 ppm | 12.5 | 96 | 108 | 118 | 130 |
| 70 ppm | 25.0 | 116 | 128 | 134 | 138 |
| 70 ppm | 50.0 | 99 | 104 | 114 | 128 |
| 70 ppm | 125.0 | 110 | 120 | 130 | 134 |
| | 12/88 Vamine/Valcohol | | | | |
| 70 ppm | 12.5 | 88 | 104 | 114 | 132 |
| 70 ppm | 25.0 | 120 | 130 | 134 | 136 |
| 70 ppm | 50.0 | 110 | 122 | 130 | 138 |
| 70 ppm | 125.0 | 108 | 114 | 122 | 136 |

TABLE 3-continued

| Flocculant Dosage (ppm) | Coagulant Dosage (ppm) Time | Drainage Volume 10 | 15 | 20 | 30 sec |
|---|---|---|---|---|---|
| | 18/82 Vamine/Valcohol | | | | |
| 70 ppm | 12.5 | 104 | 118 | 122 | 128 |
| 70 ppm | 25.0 | 102 | 114 | 130 | 144 |
| 70 ppm | 50.0 | 106 | 114 | 124 | 132 |
| 70 ppm | 125.0 | 88 | 100 | 108 | 122 |

It can be seen from the drainage numbers that the amine/alcohol copolymers have activity in this application. Activity appears to be enhanced with higher amine content. In fact, at 12 and 18% amine, the drainage values approach and/or exceed that of the standard coagulant. The quality of the drained cake was good in all runs. The coal slurry had 16% solids and was made by taking a mixture of coal grades and stirring them in water.

The 10 and 15 second drainage for the vinylamine/vinylalcohol copolymers are equal to or greater than the standard coagulant, N-9853. Cake quality was good in all of the runs. The coal slurry had 16% solids.

Changes can be made in the composition, operation and arrangement of the method of the present invention described herein without departing from the concept and scope of the invention as defined in the following claims:

What is claimed is:

1. A method for thickening and dewatering coal tailing aqueous slurries in a twin belt press process, the method consisting essentially of the step of adding to the slurry a coagulant composition including a vinylamine copolymer including from about 1 to about 99 mole percent vinylamine and from about 1 to about 99 mole percent of at least one monomer selected from the group consisting of vinylformamide, vinyl acetate, vinyl alcohol, vinyl pyrrolidone and the esters, amides and salts of acrylic acid and methacrylic acid wherein the coagulant composition is added to the slurry in a concentration from about 0.1 to about 200 parts per million; and dewatering the coagulated slurry on a twin belt press.

2. The method of claim 1 where the polymer contains from about 50 to about 99 mole percent of vinylamine.

3. The method of claim 1 where the polymer is a copolymer which contains from about 1 to about 99 mole percent of vinylformamide.

4. The method of claim 1 where the polymer contains from about 80 to about 99 mole percent of vinylamine.

5. The method of claim 1 where the polymer contains from about 5 to about 95 mole percent vinyl alcohol.

6. The method of claim 1 wherein the polymer includes from about 1 to about 50 mole percent vinylamine, from about 1 to about 50 mole percent vinylformamide and from about 1 to about 50 mole percent of it composition selected from the group consisting of acrylic acid esters, acrylic acid amides and acrylic acid salts.

7. The method of claim 1 wherein the polymer is derived from the incomplete hydrolysis of a vinylamide/vinyl acetate copolymer to yield one polymer selected from the group consisting of vinylamine/vinylformamide/vinyl alcohol terpolymer, vinylamine/vinyl alcohol/vinyl acetate terpolymer and vinylamine/vinylformamide/vinyl alcohol/vinyl acetate polymer.

8. A method for dewatering coal tailings aqueous slurries in a twin belt press process, the method including the step of adding to the slurry a coagulant composition including from about 0.1 to about 200 parts per million of a polyvinylformamide homopolymer; and dewatering the coagulated slurry on a twin belt press.

* * * * *

UNITED STATES PATENT AND TRADEMARK OFFICE
CERTIFICATE OF CORRECTION

PATENT NO. : 5,622,533
DATED : APRIL 22, 1997
INVENTOR(S) : ANTHONY G. SOMMESE AND KRISHNAN J. PILLAI

It is certified that error appears in the above-indentified patent and that said Letters Patent is hereby corrected as shown below:

COLUMN 7, CLAIM 6, LINE 6 about 1 to about 50 mole percent of it composition selected

SHOULD READ AS:

about 1 to about 50 mole percent of a composition selected

Signed and Sealed this

First Day of July, 1997

*Attest:*

BRUCE LEHMAN

*Attesting Officer*  *Commissioner of Patents and Trademarks*